United States Patent

[11] 3,559,933

[72] Inventor   Edward J. Castellani
                South Plainfield, N.J.
[21] Appl. No.  803,275
[22] Filed      Feb. 28, 1969
[45] Patented   Feb. 2, 1971
[73] Assignee   Thomas & Betts Corporation
                Elizabeth, N.J.
                a corporation of New Jersey

[54] CONDUIT MOUNTING DEVICE
     8 Claims, 5 Drawing Figs.
[52] U.S. Cl. .................................................. 248/74,
                                                         248/205
[51] Int. Cl. ...................................................... F16l 3/10
[50] Field of Search .......................................... 248/74, 70,
                                                         73, 71, 188.2, 205A

[56]              References Cited
             UNITED STATES PATENTS
  622,739   4/1899   Wahlert .......................... 248/74
2,366,867   1/1945   Nichthauser ................. 248/188.2
2,733,492   2/1956   Copell ............................ 248/74X
2,764,817  10/1956   Schwartz ..................... 248/205X
3,232,569   2/1966   Deardorf ........................ 248/74

FOREIGN PATENTS
1,055,268   1/1967   Great Britain ................  248/74

Primary Examiner—Chancellor E. Harris
Attorney—David Teschner

ABSTRACT: The invention is directed to a conduit mounting device for mounting a conduit upon a mounting surface. The conduit mounting device consists of a base portion terminating in a nest portion. The upper surface of the nest portion is formed in order to accept conduits of varying diameters while the lower surface of the nest portion is undercut so that a plurality of similar conduit mounting devices may be stacked one atop the other. A keyhole slot is provided within the base portion to permit premounting of the conduit mounting device upon a mounting surface prior to installation of the conduit thereto. A further slot is provided for accepting the fastening device of a pipe strap in any one of a plurality of positions along the length of the slot. A scale is provided on the base member adjacent the slot to facilitate the positioning of a pipe strap fastening device to accommodate varying diameters of conduit. An adhesive backing may be provided on the base portion to permit mounting of the device upon a mounting surface without the necessity for additional fastening devices.

PATENTED FEB 2 1971

3,559,933

INVENTOR.
EDWARD J. CASTELLANI
BY
ATTORNEY 3,559,933

CONDUIT MOUNTING DEVICE

BACKGROUND OF THE INVENTION

1. Field of the Invention

The invention is directed to the field of mounting conduit upon a mounting surface which is to support the conduit and direct its run from one end thereof to the other.

2. Description of the Prior Art

In the prior art, conduit spacer consisted of a flat base member upon which was placed at one end thereof a semicircular nest for receipt therein of a particular diameter of conduit. Due to the shape of the nest it was necessary to provide a different size mounting device for each of the diameters of conduit available. The flatness of the base member prevented one or more of the conduit mounting devices from being stacked one upon another. Therefore, if the mounting device was of insufficient size to span the separation between the mounting surface and the normal run of the conduit it was necessary to bend the conduit in order to engage the conduit mounting device. Alternatively, if such was not possible it was necessary to build up the mounting surface in order that the desired clearance between the conduit and the mounting surface was established.

SUMMARY OF THE INVENTION

The present invention overcomes the difficulties noted above with respect to prior art conduit mounting devices by providing a conduit mounting device which can accommodate a plurality of conduit diameters with the same mounting device and which can be stacked one atop another in order to build up a mounting device to correctly match the spacing between the mounting surface and the normal run of the conduit. This is accomplished by providing a conduit mounting device having a relatively flat base portion terminating at one end thereof in a nest portion. The upper surface of the nest portion is provided with a nest arrangement whereby a wide range of conduit diameters may be accepted by the same nest. The lower surface of the nest portion is undercut so that a plurality of mounting devices may be stacked one atop the other in order to meet spacing requirements between the normal run of the conduit and the mounting surface. The keyhole slot is provided to permit the conduit mounting device to be premounted to a mounting surface such that the conduit may be easily installed thereto at a later time. An additional slot is provided for receipt therein of the fastening device for assembling a pipe strap in a plurality of positions dependent upon the diameter of the conduit placed within the nest. A scale is provided adjacent the slot to guide the positioning of the fastening device of the pipe strap required to complete the assembly. It is therefore an object of this invention to provide an improved form of conduit mounting device.

It is yet another object of this invention to provide an improved form of conduit mounting device wherein a plurality of conduit diameters may be accepted by a single conduit mounting device.

It is still another object of this invention to provide an improved conduit mounting device wherein a plurality of such devices may be stacked one atop the other as the spacing between the conduit and the mounting surface require.

It is still another object of this invention to provide an improved conduit mounting device providing a scale for proper positioning of the assembling pipe strap dependent upon the diameter of the conduit mounted within the nest of the conduit mounting device.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWING

In the drawings in which similar elements are given similar reference characters.

DESCRIPTION OF THE PREFERRED EMBODIMENTS

Figure 1:
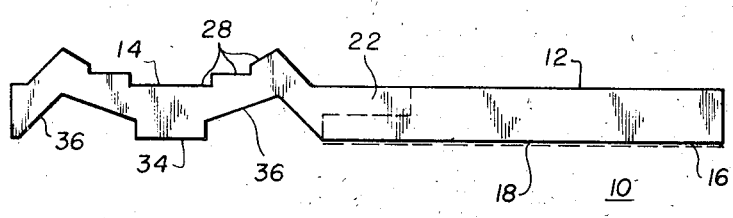
FIG. 1 is a side elevation of the preferred embodiment of a conduit mounting device constructed in accordance with the concepts of the invention.
Figure 4:
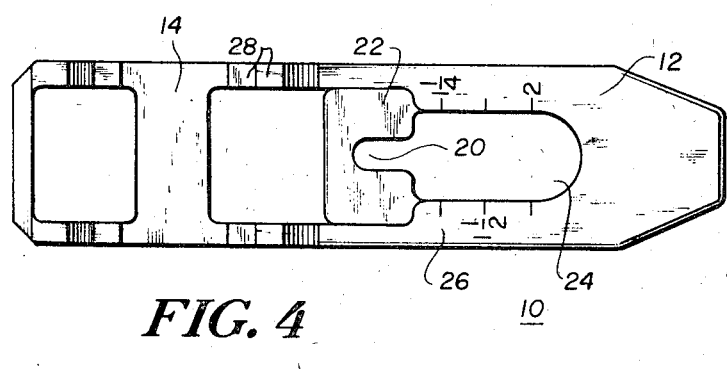
FIG. 4 is a top plan view of the conduit mounting device of FIG. 1.

Turning to FIGS. 1 and 4 there is shown a conduit mounting device 10 constructed in accordance with the concepts of the invention. Conduit mounting device 10 has a base portion 12 and a nest portion 14. The bottom surface 16 of the base portion 12 is planar for contact with a mounting surface (not shown) and may have placed thereon an adhesive layer 18 permitting mounting of the conduit mounting device 10 to a mounting surface without the requirement of additional fastening means. The adhesive layer may be pressure sensitive and would be covered with a suitable release strip or may be heat, or chemically, activated as well-known in the art. Also, placed within the base portion 12 is they the keyhole slot 20 for receipt therein of a fastening device for fastening the conduit mounting device 10 to a mounting surface. As is seen in FIG. 4, the area about keyhole slot 20 is relieved as at 22 so that a head of a fastening device (not shown) applied to fasten the conduit mounting device 10 to a mounting surface will not protrude above the top surface of the base portion 12. An elongated slot 24 is provided, communicating with the keyhole slot 20, to accept therein a fastening means employed to assemble a pipe strap to a conduit and the conduit mounting device 10 as will be described below with respect to FIG. 5. Placed adjacent the elongated slot 24 is a scale 26 for locating the fastening means employed to fasten the pipe strap to the mounting surface in accordance with the diameter of conduit placed upon the conduit mounting device 10. For example, if the conduit is 2 inches in diameter, the fastening means for the pipe strap would be placed in the center of the elongated slot 24 in line with the scale 26, calibration indicating two for 2 inches.

Figure 2:
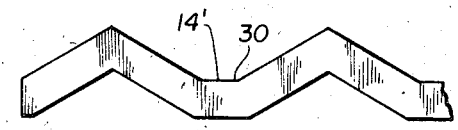
FIG. 2 is a side elevation of the nest portion of a further embodiment of a conduit mounting device constructed in accordance with the concepts of the invention.
Figure 3:
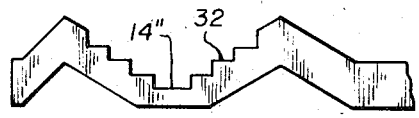
FIG 3 is a side elevation of the nest portion of a further embodiment of a conduit mounting device constructed in accordance with the concepts of the invention.

The upper surface of the nest portion 14 is shown to have a plurality of steps 28 to permit the positioning of conduit of various diameters thereupon. In this manner a number of conduit diameters may be accepted and supported by means of a the nest steps 28. In prior art devices, the nest surface was provided with a semicircular contour matching the diameter of the conduit and thus limiting the mounting device to but a single conduit diameter. Alternatively, as is shown in FIG. 2 the nest portion 14' may be provided with a single V-notch 30 permitting the conduit to be inserted as far into the V-notch 30 as is necessary to find support at two points of the conduit surface. Further, in FIG. 3 nest portion 14" is shown to have a great number of steps 32 in order that the nest 14" be able to accept a wide range of conduit diameters. If desired, the edges of the steps 28 and 32 may be made sharp to bite into the conduit to assure good ground continuity.

Turning again to FIG. 1, the lower surface 34 of the nest portion 14 is provided with undercutting as at 36, of sufficient depth and configuration to accommodate the steps 28 of a similar conduit mounting device 10. Thereby, a plurality of conduit mounting devices 10 may be stacked one atop the other to build up a mounting device to match the spacing between a conduit run and the mounting surface.

Figure 5:
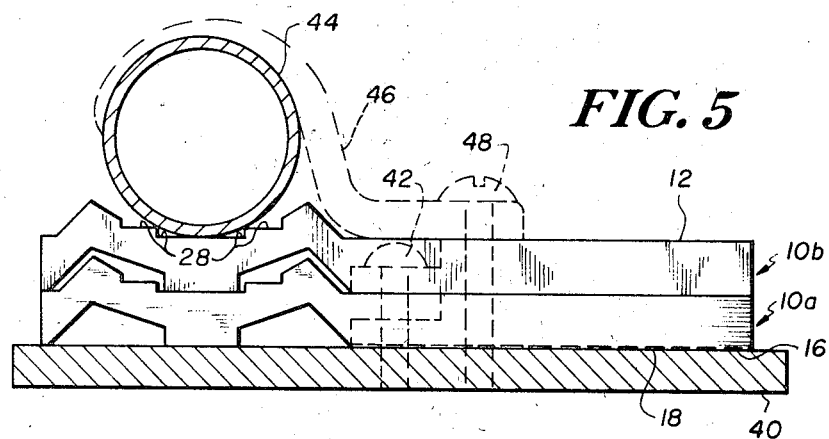
FIG. 5 is a side elevation of a plurality of conduit mounting devices as shown in FIG. 1 during their assembly with a conduit and a pipe strap.

Turning now to FIG. 5, there is shown an assembly of two conduit mounting devices 10, of the type shown in FIG. 1, with a conduit 44 and pipe strap 46. Conduit mounting device 10a is placed upon a mounting surface 40 and may be affixed thereto by means of the adhesive layer 18 placed upon the bottom surface 16 of the base portion 12. A further conduit mounting device 10b is then placed atop the first conduit mounting device 10a and may be affixed thereto by means of an adhesive layer 18. Alternatively, a fastening means 42 may be mounted upon the mounting surface 40 and the individual conduit mounting devices 10a and 10b placed upon the fastening device 42, either together or in sequence. Assembly of the conduit mounting devices 10a and 10b is accomplished by permitting the fastener 42 to enter the elongated slot 24 and then by drawing the mounting devices 10a and 10b to the right of FIG. 5. Fastening means 42 will be permitted to enter keyhole slots 20 thus locking the conduit mounting devices 10a and 10b to the mounting surface 40. A ground lead (not shown) may also be attached to fastening means 42 to ground the assembly. Conduit 44 will then be placed within the nest 14 coming into contact with particular steps 28 in dependence upon the diameter of the conduit 44. A pipe strap 46 will then be placed atop the conduit 44 and conduit mounting devices 10a and 10b and a further fastening means 48 will be passed through an aperture provided within the pipe strap 46 and thence through the elongated slots 24 into the mounting surface 40. As was noted above the scale 26, along the elongated slot 24, may be used to position the fastening means 48 for final assembly of the pipe strap 46 with the conduit 44 and conduit mounting devices 10a and 10b. Although only two conduit mounting devices 10a and 10b have been shown in FIG. 5, it should be noted that as many conduit mounting devices 10 as are required to meet the spacing between the mounting surface 40 and a conduit be employed.

While there have been shown and pointed out the fundamental novel features of the novel invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

I claim:

1. A conduit mounting device comprising: a base member; an aperture through said base member for receipt therethrough of a fastening means for fastening said mounting device to a mounting surface; and a nest portion coupled to said base member and extending therefrom; a first surface of said nest portion formed to receive conduit means extending transversely to said mounting device; a second surface of said nest portion opposite said first surface is undercut to receive therein said first surface of a similar device when stacked one atop another 2. A conduit mounting device as defined in claim 1, wherein said first surface of said nest portion is formed as a V-notch.

3. A conduit mounting device comprising: a base member; an aperture through said base member for receipt therethrough of a fastening means for fastening said mounting device to a mounting surface; and a nest portion coupled to said base member and extending therefrom; a first surface of said nest portion formed to receive conduit means extending transversely to said mounting device; a second surface of said nest portion opposite said first surface of a similar is undercut to receive therein said first surface of a similar device when stacked one atop another and said first surface of said nest portion is formed with a plurality of steps whereby a range of conduit means diameters can be accepted thereby.

4. A conduit mounting device as defined in claim 1, further comprising an undercut portion adjacent said aperture to receive the head of fastening means passed through said aperture whereby said fastening means head extends below the surface of said base member.

5. A conduit mounting device, as defined in claim 1, further comprising an additional aperture through said base member for receipt therethrough of a further fastening means.

6. A conduit mounting device, as defined in claim 1, further including a slot through said base member in communication with said aperture, said slot arranged to receive therethrough a further fastening means; said slot permitting the selective receipt of said further fastening means along a substantial portion of said base member.

7. A conduit mounting device, as defined in claim 1, further comprising an adhesive backing upon a surface of said base member to permit said device to be mounted upon a mounting surface.

8. A conduit mounting device comprising: a base member; an aperture through said base member for receipt therethrough of a fastening means for fastening said mounting device to a mounting surface; and a nest portion coupled to said base member and extending therefrom; a first surface of said nest portion formed to receive conduit means extending transversely to said mounting device; a slot through said base member in communication with said aperture, said slot arranged to receive therethrough a further fastening means; said slot permitting the selective receipt of said further fastening means along a substantial portion of said base member; a scale on said base member adjacent said slot whereby a pipe strap can be accurately positioned upon said base member when said device is assembled to said conduit means.